Jan. 12, 1932.   O. MORTENSON ET AL   1,841,046
INTERNAL COMBUSTION ENGINE
Filed May 14, 1928
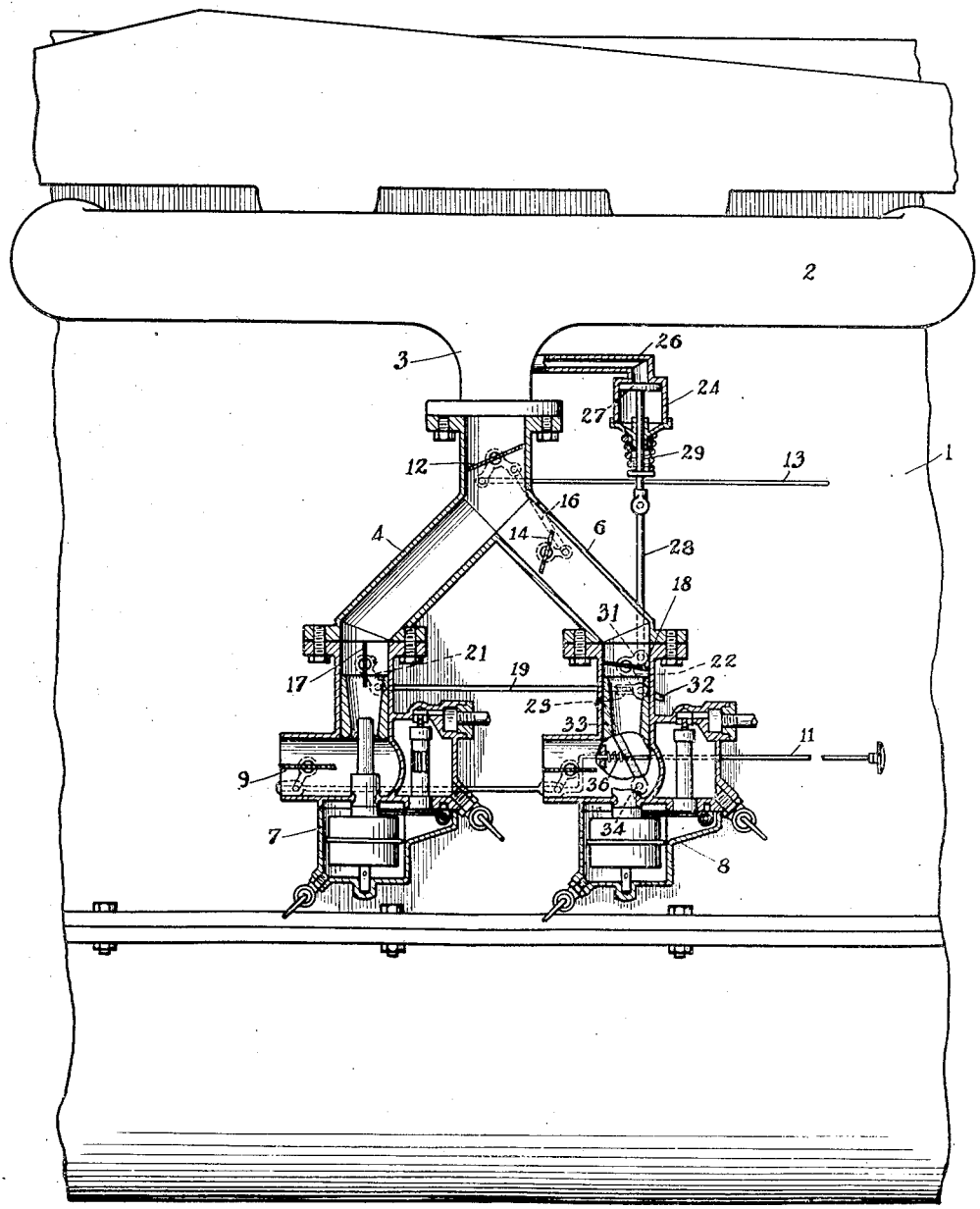
INVENTORS
OLAF MORTENSON,
BY OLFAN DEGUIRE.
Munn & Co.
ATTORNEYS.

Patented Jan. 12, 1932

1,841,046

UNITED STATES PATENT OFFICE

OLAF MORTENSON AND OLFAN DE GUIRE, OF SILVERTON, OREGON

INTERNAL COMBUSTION ENGINE

Application filed May 14, 1928. Serial No. 277,479.

The present invention relates to improvements in internal combustion engines, and has particular reference to the means for charging the combustion chamber with an explosive mixture. Our invention has particular reference to engines used on motor vehicles, and the principal object of the invention is to provide means allowing the suction of the engine to draw on two different kinds of fuel in accordance with the requirements of the engine under varying conditions, the means being arranged in such a manner that the engine may draw either on one fuel or on the other or on both for securing a mixture that will give best results under given conditions.

It is more particularly proposed to provide a slow burning fuel and a quickly burning fuel to allow the charge to be formed of one or the other or of proportions of both in accordance with the requirements of the engine.

In this connection we proceed on the theory that to obtain the most power out of the fuel the greatest force should be applied when the piston is half-way down its stroke, because in this position the crank leverage is greatest. This means the explosion should not be too sudden, as knocks in the bearings are apt to result; the piston being nearer the top, the crank leverage is less, and therefore more stress is put on the bearings and less force applied as actual turning power to the crank shaft.

Different grades of fuels making up the explosive mixture take fire spontaneously at different temperatures, burning very rapidly at this point. If the mixture is ignited before it reaches this temperature, it does not burn so rapidly, a greater reduction in temperature still reducing the burning rate.

In internal combustion engines, the temperature is due to compression plus the operating temperature of the parts less heat losses due to radiation and other causes. At slow speeds the radiation is greater than at higher speeds. At a constant speed, as the volume of the mixture is increased to maintain an increasing load, the radiation loss is not as great in proportion as in the case of the smaller volume.

From the above facts it will be seen that under different speed and load conditions to get the best efficiency out of the fuel either the conditions will have to be changed or the fuel will have to be changed to meet the condition.

The heat due to the compression might be changed to keep it constant by increasing or decreasing the space above the piston head as under different load conditions, but mechanical difficulties would be encountered.

The present invention solves the problem in a different way, namely, by changing the fuel to meet the different conditions, by means of a simple device. Our pending application Serial No. 197,098 for Letters Patent on a fuel control takes care of the different conditions due to the different load and speed by leaning out the mixture as the heat becomes greater. But the additional air to the mixture does not add energy, it only reduces its burning rate, and as the load increases we finally reach a point where we can no longer use this method. At slow speeds and very light loads, as under level load conditions, the volume of the explosive mixture is small and heat radiation is great in proportion to the amount of energy represented; furthermore, the heat due to compression is low, therefore the mixture has to be richer to supply enough heat to make up for this condition. At heavier loads, the heat radiation is less in proportion and the heat from compression greater, hence the mixture can be leaner, but as the load increases the mixture to be consumed will soon have to be richer to obtain enough power to carry the load. Since the compression increases with the load and therefore the heat, the mixture will burn too rapidly to obtain the best results. We are avoiding the above difficulties by using two grades of fuel, one which ignites spontaneously at a lower temperature than the other, and blending the two to meet the different conditions, this being done automatically by our device as the conditions change, that is, at light loads the faster burning fuel is used, and a gradual blending of the two fuels takes place as the load increases, while at heavier loads only the slower burning or less explosive fuel is used.

If we use a fuel which is slow burning to a sufficient degree, it would be possible to use a higher compression engine, that is, one with a smaller compression volume above the piston head, and this would give a better efficiency at the light load conditions.

In other words, by using a compression volume best suited to the faster burning fuel at average light load conditions, and using a slower burning fuel that would be most efficient with this compression volume at the highest loads, and blending the two fuels in proportion to meet the conditions in between, we would get better efficiency at all times.

The preferred form of our invention is illustrated in the accompanying drawing, which shows in vertical section our arrangement which allows the suction of the engine to draw on one fuel or the other or on both.

While we have shown only the preferred form of our invention, we wish to have it understood that various changes or modifications may be made within the scope of the claims hereto attached without departing from the spirit of the invention.

Referring to the drawing in detail, it will be seen that the engine casing 1, of which only part is shown, is provided with an intake manifold 2 connecting with a downwardly-extending conduit 3, which latter terminates in two branches 4 and 6, which latter are connected to two carburetors 7 and 8 respectively, the two carburetors being of any suitable design and the former one being made to contain a rapid burning fuel while the other carburetor is provided with a slow burning fuel. The carburetor 7 is provided in the conventional manner with a choke valve 9 adapted to be operated by means of a rod 11 leading to the dashboard for operation by the driver of the machine.

The conduit 3 before branching out is formed with a throttle valve 12 adapted to be operated by the driver by means of a rod 13 in the conventional manner. The branch 6 preferably contains another throttle valve 14 interconnected with the throttle valve 12 by means of a rod 16 so that the valve 14 follows the motions of the valve 12.

The purpose of the valve 14, which under certain conditions might be dispensed with altogether, will be explained later.

Each of the two branches contains a throttle valve 17 and 18 respectively, the two valves being interconnected by means of a link 19 pivoted to the two operating arms 21 and 22 respectively. The two valves are interconnected in such a manner, as shown in the drawing, that one of the valves is closed when the other is open and vice versa, and the connecting link 19 is preferably made adjustable by being threaded as shown at 23, so that the relative positions of the two valves may be changed.

A cylinder 24 communicates through a pipe 26 with the intake conduit 3 and has a piston 27 reciprocable therein, which latter piston is formed with a connecting rod 28 and is normally urged downward by means of a spring 29. The connecting rod 28 of the piston connects with an arm 31 associated with the valve 18 so that both of the valves 17 and 18 are operated by the piston 27 in opposite senses.

The arm 22 extending from the throttle valve 18 is extended beyond the connection with the link 19 as shown at 32, and this extension is positioned for operation by an arm 33 pivoted to the housing of the carburetor 8 as shown at 34. This arm is connected to the rod 11 operating the choker valve so that when the choker valve is pulled outward for starting the engine the extension 32 of the arm 22 is thrown into the position indicated in the drawing which is the proper starting position. A spring 36 counteracts the tendency of the spring 29 to change this position.

The operation of our invention may be best explained as follows:

The two valves 17 and 18 are operated by the connecting rod 28 and the piston 27. When the piston is pulled upward by the suction of the engine as indicated in the drawing, the light fuel valve 17 is open while the heavier fuel valve 18 is closed. This is the proper position for idling speeds when the vacuum created by the suction of the engine is highest and the piston 27 is pulled clear up against the action of the spring 29. As the throttle valve 12 is opened to accelerate the car, the vacuum drops off in proportion, increasing again as the speed of the engine increases, but since the load is greater at higher speeds on level road, the vacuum will not be quite as high, depending on the increase in load, due to air friction against the car, etc.

The percentage of the slow burning fuel then increases proportionately. When climbing a hill, the vacuum will drop off and increase the percentage of the slow burning fuel, and at full load with wide open throttle and the car traveling slowly, the vacuum is lowest while the compression is highest and the valve 18 will be wide open and the engine be supplied only with the slower burning fuel.

As the grade becomes less, the engine speeds up, the compression decreases, the vacuum begins to increase, and valve 17 is opened to some extent while valve 18 is closed in the same degree so that the two fuels are mixed in proportion. At full speed on level roads the mixture of the two fuels will be in proportion to the compression which depends upon the load and which controls the suction. There will then be a different fuel combination to meet the different heat conditions due to changes in compression.

The two carburetors should be designed without idling jets. If an idling jet is to be used, it should be placed next to the throttle valve 12. The relative position of the valves 17 and 18 may be changed by adjustment of the connecting rod 19 and also by shifting the arm 21 relative to its valve 17. It should be understood that it is not necessary to operate the two valves 17 and 18 by means of a single piston, but that the same results would be obtained by operating each valve by an individual piston.

The position for the valves 17 and 18 indicated in the drawing is the correct starting position, but it is apparent that when the engine is at rest the piston 27 will be forced outwardly by the spring 29, which will cause the valves 17 and 18 to occupy a reverse position. In order to correct this position before starting, the arrangement of the arm 33 connected to the choker rod 11 and operating the extension 32 is provided so that on the operation of the choker rod the two valves 17 and 18 are moved into the correct position for starting and the spring 36 counteracts the tendency of the spring 29 sufficiently to hold the valves in the desired position.

The valve 14 is not needed under ordinary operating conditions, and its purpose is to prevent air from going through the carburetor 8 at idling or slow speeds in case the vacuum should get unsteady (due to some fault of the engine) and cause the piston to open the valve 18 when it should be closed. The valve 14 always co-acts with the throttle valve 12, and therefore is always open sufficiently not to hinder the action of the valve 18 if it is working properly.

We claim:

1. In combination with an internal combustion engine, two charge-forming devices, an intake conduit having a throttle valve therein and having two branches below said valve, a control valve in each branch, means operated by the suction of the engine for manipulating the control valves, the said means being arranged to affect the valves in reverse directions, and a second valve in one of the branches operatively connected with the throttle valve for operation with the latter.

2. In combination with an internal combustion engine, two charge-forming devices, each having a choke valve with manual control for the same, an intake conduit having a throttle valve therein and having two branches below the same, a control valve in each branch, means operated by the suction of the engine for manipulating the control valves and an operative connection between the choke valve control and the two branch valves allowing the latter to be operated by the former independently of the choke valves.

3. In combination with an internal combustion engine, two charge-forming devices, an intake conduit having a throttle valve therein and having two branches leading from said valve communicating with the said devices, a control valve in each branch, means operated partly by the speed of the engine for manipulating the control valves whereby the same are reversely affected and means capable of changing the ratio of the two branch openings operatively connected with the throttle valve for operation with the latter.

OLAF MORTENSON.
OLFAN DE GUIRE.